INVENTORS:
ARNOLD O. BECKMAN,
JAMES D. McCULLOUGH,
By HARRIS, KIECH, FOSTER & HARRIS,
FOR THE FIRM
ATTORNEYS

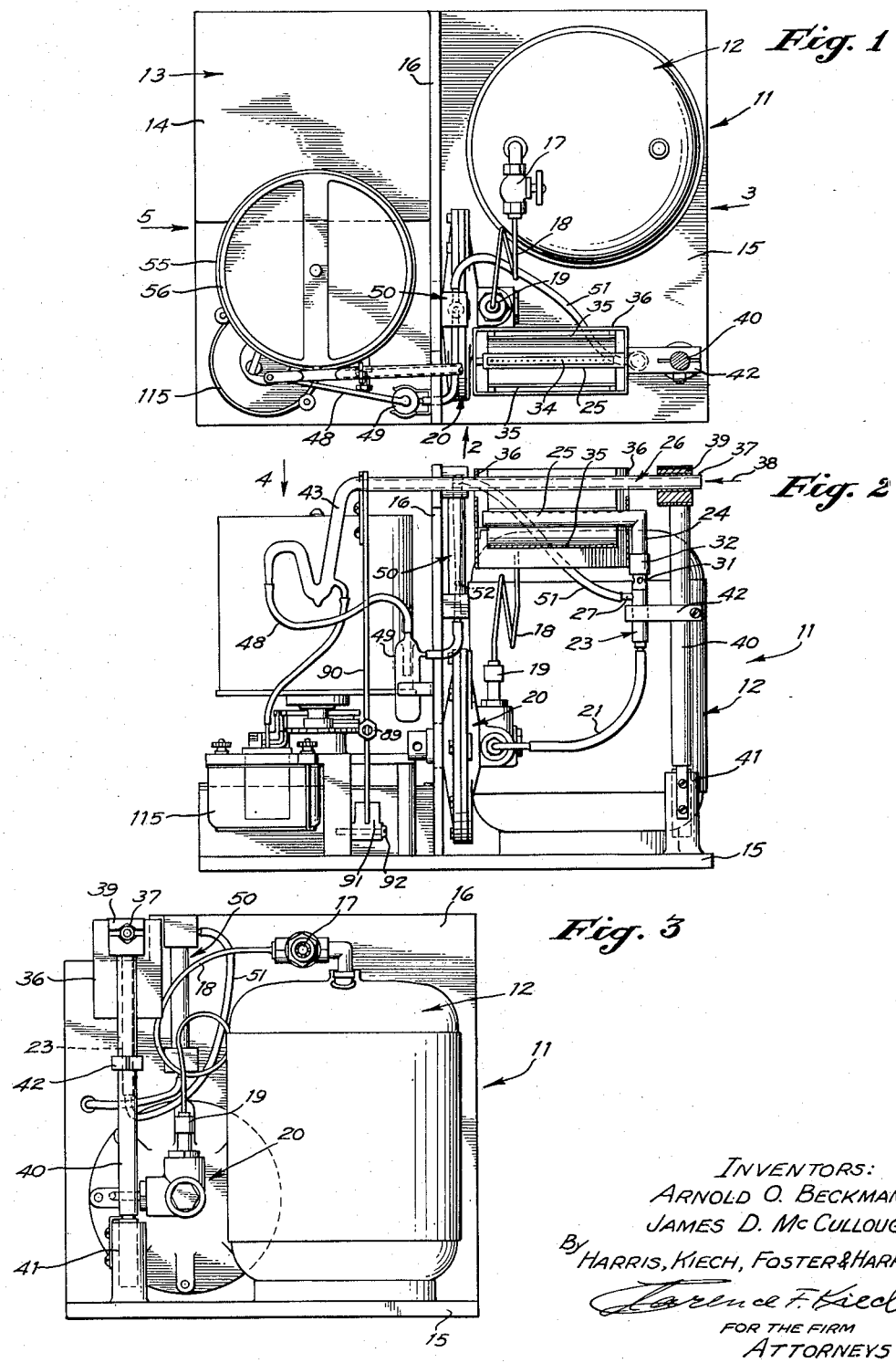

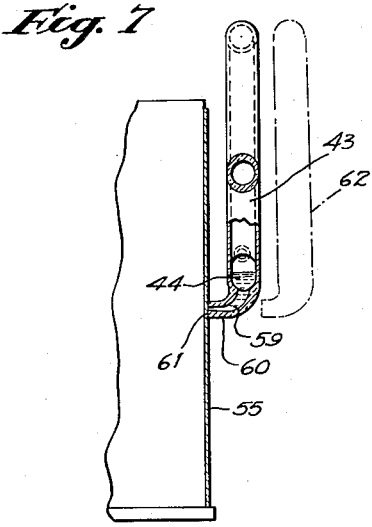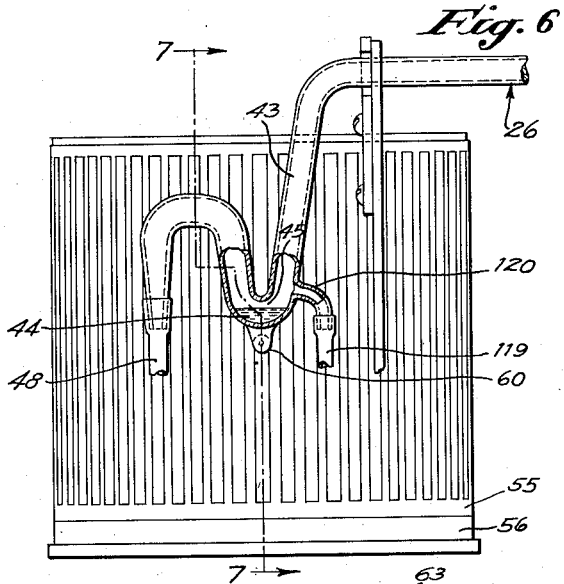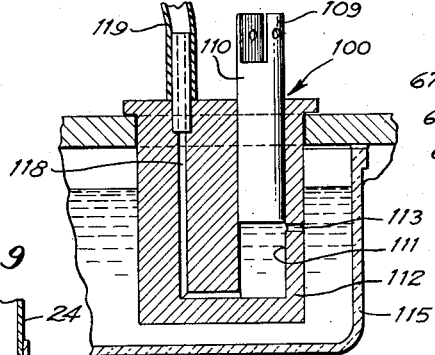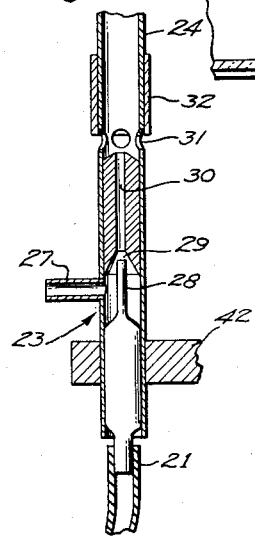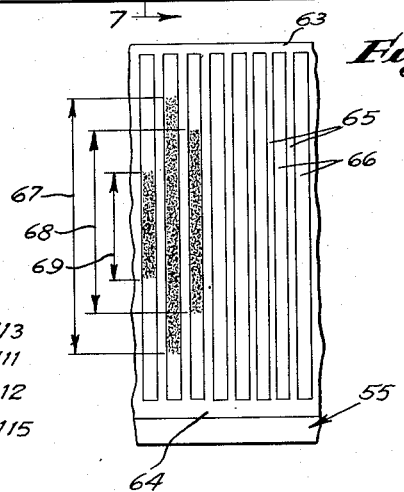

Patented Oct. 7, 1952

2,613,126

UNITED STATES PATENT OFFICE 2,613,126

RECORDING APPARATUS FOR RECORDING GAS CONCENTRATIONS IN THE ATMOSPHERE

Arnold O. Beckman, Altadena, and James D. McCullough, Los Angeles, Calif.; said McCullough assignor to said Beckman Application February 18, 1946, Serial No. 648,496

4 Claims. (Cl. 346—75)

Our invention relates to a measuring apparatus for indicating or recording variations in a phenomenon, such as variations in minute concentrations of a substance in a gas. While capable of many uses, the invention will be specifically exemplified with reference to the indication or recording of minute concentrations of poisonous gas in the atmosphere, typically mustard gas.

The determination of the presence of minute amounts of a substance, such as mustard gas in air, presents a difficult problem. Equipment for field use must be simple and sturdy and, preferably, should produce a record which can be immediately read. Proposals to discolor a strip of indicator paper by direct reaction with the substance in question to produce a visible record have not been found practical. Attempts to heat the air with the contaminated substance, such as mustard gas, to convert the substance into an acidic substance and then to measure the amount of acidic substance by use of indicator papers have also not been practical, particularly with low concentrations of the substance.

Concerning this problem, the present invention contemplates such heating to produce an acidic substance, such as HCl, in the heated air stream, which stream is then flowed in contact with a medium such as water which becomes increasingly acidic with continued flow. The invention contemplates also the measurement of such acidity as a measure of the concentration of the substance, such as mustard gas, in the air. The preferred type of measurement involves determination of the acidity of such water or other medium after a predetermined time of contact with the acid-containing air, the acidity being measurable in any one of a number of ways, typically by use of an indicator paper or record member of the invention. In the present specification, the terms "measure" or "measurement" are used in a sense generic to indicating or recording.

It in an object of the present invention to provide a novel method and apparatus for measuring minute concentrations of a substance and, in the preferred embodiment, to provide a self-contained device capable of periodically measuring such concentrations.

Another object of the invention is to measure minute concentrations of a substance (e. g., mustard gas in air) indirectly by cumulative or prolonged action thereof on a medium (e. g., a small body of water), the medium being then tested to give a measurement of the concentration.

Another object is to provide a method and apparatus for measuring, i. e., indicating or recording, a minute concentration of such a substance in a stream of gas or other material, and which involves flowing the stream in contact with a medium reactive with, or absorptive of, the substance in question, the modified medium being used to produce the desired indication or record. Another object of the invention is to use a receptive liquid as such a medium.

A further object of the invention is to modify a body of a receptive liquid by the phenomenon to be recorded (e. g., by contacting same with the substance to be measured or a derivative thereof to effect absorption thereof by the receptive liquid) and using the modified body of receptive liquid to produce an indication or record of the degree of modification, and thus produce an indication or record of the phenomenon to be recorded. A further object is to modify such a body of receptive liquid sequentially, the body being renewed between its uses to produce the indication or record.

Another object of the invention is to provide a novel method and apparatus for recording a variable phenomenon by use of a record member which is progressively modified or discolored in adjacent bands, the length of the modified or discolored portions of such bands varying in correspondence with variations in the phenomenon to be recorded. In this manner, the extremities of the discolored or modified portions represent graphically the variations in the phenomenon.

A further object is to provide a novel recording method and apparatus employing a record member which moves relative to a recording station, adjacent transverse bands of the record member being modified when passing the recording station, the length of the modified portion of each band being a function of the phenomenon to be recorded.

A further object is to use a record member of the indicator type, typically an indicator paper, and to contact same with a medium (e. g., a solution) which varies from neutrality or in pH, or otherwise, in correspondence with variations in the phenomenon to be recorded. A related object is to confine the action of such a medium on the indicator-type record member to a narrow transverse band to produce, for example, a discoloration of the band which varies in length with the pH of the medium or total amount of absorbed substance.

A further object is to provide a novel apparatus for producing immediately-visible records or record marks in adjacent bands of a record member, the bands being in side-by-side relationship whether separated from each other, contacting each other, or somewhat overlapping. In this connection, it is an object of the invention to contact side-by-side bands of a record member with a medium capable of producing a visible record or mark on the record member, the medium being quantitatively varied in correspondence with the variations of the phenomenon to be recorded.

A further object of the invention is to provide a novel record member of the indicator type with adjacent bands which can be individually discolored by a variable medium, and in which the bands are separated to confine the action of the medium at a particular time to a single band.

Other objects of the invention lie in the provision of an intermittently operating mechanism with appropriate drives therefor, and which is capable of giving a series of measurements of a variable phenomenon.

A specific object of the invention is to provide a novel method and apparatus for accurate determination of minute concentrations of poison gases or other contaminating substances in the atmosphere. In this connection, it is an object of the invention to provide a device which will measure minute concentrations of acid-forming substances, typically organic compounds containing halogen, sulfur, or other substances which form acids or acid anhydrides upon heating in the presence or absence of oxygen.

Still further objects and advantages of the invention will be evident to those skilled in the art from the following description of an exemplary embodiment of the invention particularly designed for the measurement of minute concentrations of mustard gas in the atmosphere.

Referring to the drawings:

Fig. 1 is a top view of the device;

Fig. 2 is a side elevational view of the device, taken in the direction of arrow 2 of Fig. 1;

Fig. 3 is an end view of the device, taken as indicated by the arrow 3 of Fig. 1;

Fig. 6 is an enlarged fragmentary view of a portion of the device as shown in Fig. 2, illustrating the drum and the operating tube of the invention;

Fig. 7 is a sectional view, taken along the broken line 7—7 of Fig. 6;

Fig. 8 is a sectional view of the pump of the invention, taken along the line 8—8 of Fig. 5;

Fig. 9 is a sectional view of the aspirator of the device; and

Fig. 10 illustrates a portion of the record member.

Figure 4:
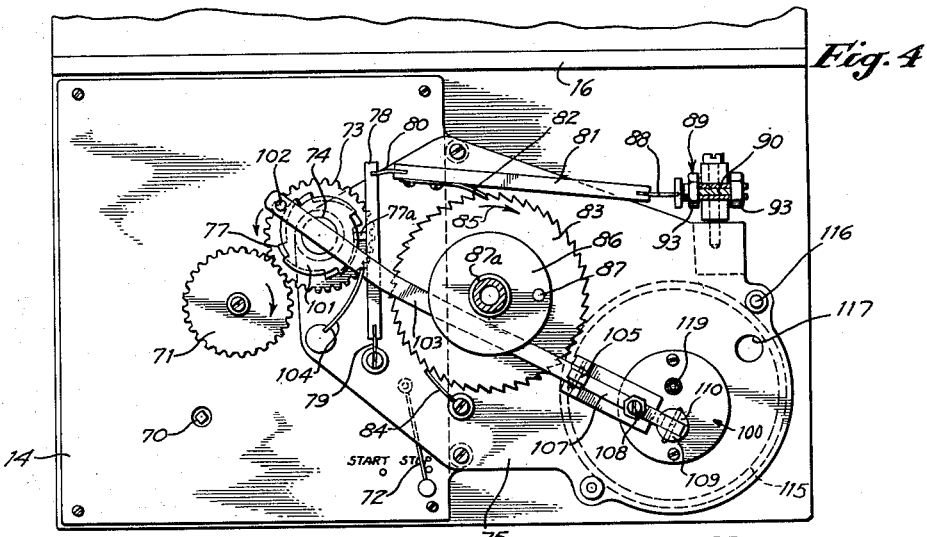
Fig. 4 is a view of the operating mechanism of the device with the drum removed, and is taken substantially as indicated by the arrow 4 of Fig. 2.

The measuring apparatus is indicated generally by the numeral 11 and is herein exemplified as a self-contained unit, the power for driving the various units being derived from a pressured container 12 or a suitable clockwork 13, shown as covered by a closure 14. The device is mounted on a base 15 carrying a vertical partition 16, and its mechanism is usually completely enclosed by a removable cover, not shown.

The pressured container 12 preferably contains a pressured fuel, typically a liquefied petroleum gas such as butane, which serves both to heat the sample stream of air and to draw this stream through the apparatus. As shown best in Figs. 1–3, the liquefied fuel flows through a manual control valve 17 through a small looped pipe 18 to a filter 19 and thence to a pressure regulator 20, in accordance with well-known practice, the fuel expanding and vaporizing when a small flow thereof passes through the valve 17. The pressure regulator 20 delivers a constant or regulated-pressure stream of the now-gaseous fuel through a rubber tube 21 to an aspirator 23.

The aspirator 23 serves the dual function of mixing air with the fuel to form a combustible mixture delivered through a pipe 24 to a burner 25 and to aspirate a sample air stream through a quartz tube 26 and to move the treated air stream through subsequent equipment to be later described, this air stream entering the aspirator 23 through a connection 27. The details of such an aspirator are best shown in Fig. 9. Referring thereto, the rubber tube 21 delivers a stream of the gaseous fuel to a nozzle with a small tip 28 terminating just above the connection 27 and discharging into a tapered throat 29 with which the connection 27 communicates to aspirate gases from the sample air stream into the throat 29 to mix with the fuel. The resulting mixture moves upward from narrow passage 30 at substantial velocity and flows past air-admitting openings 31 to aspirate air therethrough in amount sufficient to form a combustible mixture. The amount of air admitted through openings 31 is controlled by a sleeve 32 slidable on the pipe 24.

The fuel-air mixture enters the burner 25 and is expelled as a plurality of jets through burner openings 34, which are directed upwardly toward the quartz tube 26 to heat same. A U-shaped reflector 35 extends beneath and on opposite sides of the burner 25 to concentrate heat rays on the quartz tube 26. The entire burner structure is surrounded by a burner housing 36 which carries the reflector 35 and which is open at its upper and lower ends. The burner housing 36 provides aligned openings on opposite end walls through which the quartz tube 26 loosely extends, the housing 36 hanging on the quartz tube.

The quartz tube 26 provides an entrance end 37 open to the atmosphere to receive the initial aspirated sample air stream which enters as indicated by the arrow 38. This entrance end 37 is held in a clamping structure 39 which is, in turn, secured to a pivoted post 40 to swing about the vertical axis of the post. In the illustrated embodiment, the post 40 pivots in a socket 41 and is surrounded by a clamp 42 which carries the aspirator 23 which, in turn, carries the burner 25. Correspondingly, the quartz tube 26, the aspirator 23, the burner 25, and the burner housing 36 pivot together as a unit about the vertical axis of the post 40.

If the sample air stream contains an acid-forming substance, such as mustard gas or any organic material which contains halogen, sulfur, or other substances which form acids or acid anhydrides upon heating, each substance will be converted into an acid or acid anhydride when passing through the heated section of the quartz tube 26. Thus, mustard gas will be converted into the corresponding hydrogen chloride and other products.

The resulting modified air stream then passes through a U-shaped operating tube 43, best shown in Figs. 2, 6, and 7, and which may be a bent continuation of the quartz tube 26. In this operating tube, the modified stream is made to contact a receptive medium which will absorb or react with the acid or acid anhydride. In the illustrated embodiment, this medium is shown as a small body of liquid, typically distilled water, indicated by the numeral 44, which only partially fills the bottom of the U-shaped operating tube 43, as suggested in Fig. 6. Such a body of water 44 presents a relatively extensive surface for contact with the modified air stream flowing through a narrow space 45. In measuring concentrations of mustard gas, when using a body 44 of distilled water, this water will progressively absorb the hydrogen chloride and other products of the modified air stream and will become progressively more acidic substantially in proportion to the amount of the modified stream flowing in contact therewith and the amount of the hydrogen chloride and other products therein. The acidity or pH of the body of water 44, after the lapse of any predetermined time, will thus be a measure of the concentration of mustard gas in the surrounding atmosphere.

The spent gas of the modified stream moves from the operating tube 43 through a rubber tube 48 to a liquid trap 49, best shown in Figs. 1 and 2, from whence it flows to a flow meter 50 and thence through a rubber tube 51 to the connection 27, whereby the spent gases are mixed with the fuel and any residual substances tend to be burned. The flow meter 50 may be of the rotameter type in which a small ball 52 is lifted in a tapered passage of a transparent tube to a height indicative of the flow rate, the tube being calibrated or carrying a single calibration mark to indicate the correct flow rate. In practice, with an instrument of the type exemplified, a flow rate of about 200–500 ml./min. will usually be found satisfactory. This flow rate is controlled by adjustment of the valve 17 so that simultaneous change in fuel and flow rate of air is effected by a single adjustment, whereby the increased heating required by an increase in the sample stream is automatically obtained. Usually, however, it is preferable to set the valve 17 for a preselected rate of flow of the sample stream as measured by the flow meter 50.

Figure 5:
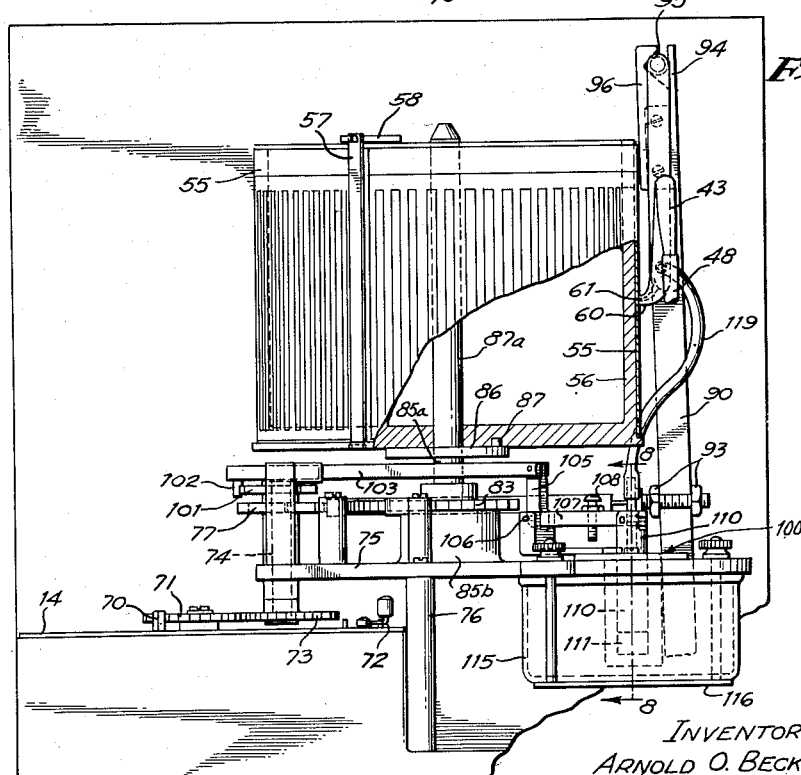
Fig. 5 is a fragmentary end view of the device, partially in section, taken generally as indicated by the arrow 5 of Fig. 1.

While various methods can be used for determining the acidity or pH of the body of water 44, we prefer to expel this body of water and measure its acidity by use of a record member 55 wrapped around a drum 56 and held in place to completely encircle the drum by use of a removable strip 57, best shown in Fig. 5, and latching into a latch member 58 to compress the ends of the record member 55 against the drum. The record member 55 may be a blotting paper impregnated with an indicator, typically Congo red, the record member preferably being banded as hereinafter described.

Expulsion of the body of acidic water 44 onto the record member 55 to produce a visible record is best accomplished through use of a small capillary passage 59 formed in a fluid-expelling member, shown as a curved spout 60 at the bottom of the operating tube 43, the spout providing a ground face 61 adapted to engage the record member 55 when the operating tube 43 is in its full line position of Fig. 7. This operating tube 43 swings with the quartz tube 26 about the vertical axis of the post 40 to be displaced into the dotted line position 62 of Fig. 7. The operating tube 43 assumes this dotted line position during acidification of the body of water 44, the capillary size of the passage 59 preventing gravitational drainage of the water therefrom. If, however, the operating tube is moved into light percussive contact with the record member 55, the sudden stoppage and the absorptive nature of the record member 55 will drain or expel the acidic water slowly from the well provided at the bottom of the operating tube 43.

As the acidic water is absorbed by the record member 55, the indicator therein will react with the acid to discolor the record member and produce a visible record or mark. In the absence of the banding of the record member hereinafter described, the resulting discoloration will extend radially substantially equal distances from the zone of contact with the ground face 61 and the radial extent of discoloration will be a measure of the acidity or pH of the water body 44, now completely drained from the operating tube 43, and also will be a measure of the mustard gas or other substance which was modified by heat to result in the acidification. The record member 55 will be wetted in a zone beyond the discoloration, it being clear that the acid is neutralized by the Congo red and, after neutralization, the residual water will be absorbed in an outer zone, although this outer zone will not be discolored because no acid is present in the solution absorbed thereinto.

On the other hand, it is distinctly preferable to confine the discoloration to a narrow transverse band of the record member 55. A banded record member having band-isolating transverse lines is suggested in Fig. 10 and can be made by marking, coating, or spraying the lines with a non-wettable substance which will isolate the wetting of the record member to the intervening bands. The preferred method of banding involves spraying lacquer through a suitable mask onto the record member 55 in upper and lower zones 63 and 64; also, in transverse zones 65 which form the band-isolating lines and which are separated from each other to leave bands 66 of the record member uncoated.

With this arrangement, if the drum 56 is turned so that the ground face 61 contacts one of the uncoated bands 66, the discoloring action of the acidic water will be confined to this band and the length of discoloration will be a function of the acidity. By proper isolation of the bands 66, there will be no sidewise absorption tending to discolor adjacent bands. Thus, if the body of water 44 is periodically renewed and each body of water is displaced onto a separate band 66, a series of side-by-side records or marks will appear on adjacent bands and the extremities or limits of the discolored portions will represent the different acidities and also the different concentrations of mustard gas or variations in concentration of such gas. An attempt has been made in Fig. 10 to show three successive bands 66 of different length, represented respectively by dimensional arrows 67, 68, and 69 between the extremities thereof. Wetting of each band 66 will extend beyond the discoloration. The length of each band may be directly measured as an indication of the concentration in question but, for most accurate results, reference should be had to calibration tables which can be worked out for different lengths of wetting to show the exact concentrations corresponding to the length of discoloration, even though the concentrations be low, such as 0.15 gamma of mustard gas per liter of air. Of course, if the volume of the body of water 44 is exactly the same with each renewal, the extent of wetting will also be the same. However, slight variations in the volume of the water body are often encountered and can be compensated for by tables for each length of wetting and showing the concentration corresponding to the length of discoloration. While the present embodiment shows the ground face 61 as contacting the record member near the center of an exposed transverse band 66, in which event discoloration will progress upwardly and downwardly, this is not essential. If desired, the ground face 61 can contact the upper or lower end of such exposed band, in which event discoloration will progress in only one direction.

The illustrated embodiment includes automatic means (1) for moving the drum 56 step by step to bring adjacent bands 66 opposite the capillary passage 59; (2) for intermittently re-charging the operating tube 43 with the body of water 44; and (3) for intermittently moving the operating tube 43 through a cycle in which its two extreme positions are shown in Fig. 7. Such means are controlled by the clockwork 13 which can be wound by a key applied to a squared shaft 70 of Fig. 4. The details of the clockwork are not illustrated. Suffice it to say that this clockwork drives a gear 71 at a constant speed when a start-stop lever 72 (Figs. 4 and 5) is shifted to a "start" position.

The mechanism for advancing the drum 56 step by step includes a second gear 73 meshing with the gear 71 and rotating a vertical shaft 74 journalled in a tubular extension of a plate member 75 carried on posts 76 of the base 15. This shaft 74 carries an angularly-adjustable, multi-lobe lower cam 77 resiliently engaged by a follower 77a of an arm 78 pivoted by a leaf spring 79 attached to the plate member 75. The free end of the arm 78 is connected by a leaf spring 80 to an operating member 81 which carries a ratchet member 82, movable therewith and advancing a ratchet wheel 83 tooth by tooth. Another ratchet member 84 is fixed to the plate member 75 to prevent reverse motion of the ratchet wheel 83. In this manner, the ratchet wheel is turned tooth by tooth in the direction of arrow 85. This ratchet wheel 83 is carried by a shaft 85a which is pivoted relative to the plate member 75 by extending into a bore of a boss 85b thereof. The shaft 85a carries a circular plate 86 on which the bottom of the drum 56 rests. A pin 87 of the plate 86 extends into a corresponding opening of the drum to insure a positive drive. The upper end of the shaft 85a provides a post 87a extending upward from the plate 86 and removably receives and centers the drum 56. The angular distance between the teeth of the ratchet wheel 83 is equal to the angular distance between bands 66 of the record member. The follower 77a of the arm 78 is limited in its motion toward the faces of the cam 77 by engagement between the ground face 61 and the record member 55, as will be later described. Such engagement acts as a stop means and holds the follower 77a from the faces of each lobe of the cam 77 during a portion of each revolution of the cam, wherefore the drum 56 is stationary during such fractional rotation, after which the follower engages the surface of the cam, later movement to the crest of the cam turning the ratchet wheel 83 one notch. After the follower 77a passes the crest of the cam, it drops quickly into the succeeding notch of the cam and the ratchet member 82 moves rearwardly to engage the next tooth.

The mechanism for moving the operating tube 43 between its two positions shown in Fig. 7 is operated by the aforesaid reciprocation of the operating member 81. As best shown in Fig. 4, the forward end of this operating member 81 is joined by a spring member 88 with a clamp structure 89 adjustably connected to a vertical member 90 pivoted at its lower end to swing parallel to the partition 16. For example, the lower end of the vertical member 90 is connected to a journal member 91 (Fig. 2) pivoting on a horizontally disposed screw member 92. The clamp structure 89 is adjustable vertically on the vertical member 90 to vary the lever arm. It provides also nuts 93 (Figs. 4 and 5) for adjustment of the angle between the vertical member 90 and the operating member 81.

The upper end of the vertical member 90 provides a tongue 94 cooperating with a notch 95 of an adjustable member 96 to form a space receiving the quartz tube 26 near its junction with the operating tube 43. The vertical member 90 thus provides a hinged support for the quartz tube at this point.

It will be apparent that the vertical member 90 reciprocates with the operating member 81 and, in doing so, it carries the operating tube 43 between its two positions shown in Fig. 7. Rearward movement of the upper end of the vertical member is limited by engagement between the ground face 61 and the record member 55 to form the stop means previously described. When the operating member 81 advances forwardly, it swings the vertical member 90 forwardly and moves the operating tube 43 to its dotted line position 62 of Fig. 7. From the mechanism thus far described, it will be apparent that the ground face 61 will be moved from engagement with the record member 55 as soon as the follower 77a of the arm 78 engages the surface of a lobe of the cam 77. Further movement of the cam moves the operating tube 43 slowly toward its dotted line position and, during this cycle of the operation, the gas sample is acidifying the body of water 44. Also during this portion of the cycle, the drum 56 is advancing to present a new band 66 to the recording position adjacent the ground face 61. As soon as the follower 77a moves from the crest of the lobe of the cam 77, the operating tube 43 moves quickly toward the record member 55, the ground face 61 contacting same with a slight percussive action sufficient to start drainage of the body of water. The operating tube 43 remains stationary in this position, to permit complete drainage of the body of water 44, until the follower 77a of the arm 78 again engages the next lobe of the cam 77.

The means for intermittently renewing the body of water 44 includes a small spring-actuated pump 100, best shown in Fig. 8 and released by the clockwork 13 in a manner best shown in Figs. 4 and 5. Referring to the latter figures, the shaft 74 carries an upper cam 101 which is adjustable in angular position relative to the shaft and which provides a number of lobes equal to the cam 77. The sole function of the upper cam 101 is to cock and trip the pump 100. This upper cam is engaged by a follower 102 of a pump-operating arm 103 which is moved longitudinally by the cam. A rear portion of the arm 103 is carried by the free end of a spring 104 whose other end is connected to the plate member 75. This spring not only guides the arm 103 but exerts a resilient pump-actuating pressure thereon. The forward end of the arm 103 is connected to one arm of a bell crank 105 pivoted at 106. The other arm 107 of the bell crank carries a stroke-adjusting screw 108 and extends between bifurcations 109 of a pump plunger 110 to which it is pivotally connected. As the pump-operating arm 103 is drawn rearwardly by the follower 102 rising on a lobe of the cam 101, the plunger 110 is raised to or above the position shown in Fig. 8. As soon as the follower drops from the crest of this lobe of the cam, the spring 104 forces the plunger 110 quickly downward.

The plunger 110 reciprocates in a cylinder 111 of a pump body 112. A small entrance port 113 admits water to the cylinder 111 when the plunger 110 is raised. This water is contained in a reservoir 115 supported beneath the plate member 75 by a saddle 116, the reservoir being filled from time to time through opening 117 (Fig. 4). When the plunger 110 lowers under the action of the spring 104, it closes the entrance port 113 and displaces a metered quantity of water from the cylinder 111 through an exit passage 118 and a small rubber hose 119 into a neck 120 of the operating tube 43. The neck 120 preferably opens on the operating tube at a position slightly above the normal water level therein, as best shown in Fig. 6. Correspondingly, such downward movement of the plunger 110 displaces a metered amount of water into the now-drained operating tube 43. The amount of water required is very small and need be no more than a few drops.

The timing of the pump is such that the new increment of water is delivered to the operating tube 43 only after complete drainage of the previously-contained acidified water. Normally, the pump is timed to discharge a new increment promptly after the ground face 61 separates from the record member 55.

While a completely automatic mechanism has been shown, it should be understood that the invention is not limited thereto. Nor is it limited to the making of a record extending over a prolonged time, e. g., 12 or 24 hours, as is possible with the illustrated embodiment. In its broader aspects, the invention comprehends discoloration or otherwise forming records or marks in side-by-side bands of a record member if the record is to show the variations over a prolonged period of time. In other instance, of course, the invention can be used for individual tests and need not be automatically operating.

It should be clear, also, that the invention is not limited to the measurement of mustard gas. It is equally applicable to the measurement of other halogen-containing compounds or other substances which form acids or acid anhydrides upon heating, whether the heating is in the presence or absence of oxygen. In this connection, the invention can be employed to measure sulfur content but, in this instance, greater sensitivity can be obtained by disposing within the heated quartz tube 26 a catalyst, such as platinum foil, aiding the production of acids or acid anhydrides.

Furthermore, while the invention has been exemplified with reference to systems in which the medium or body of water 44 becomes progressively more acidic, it should be clear that the device is useful also in other measurements in which such medium becomes progressively more alkaline. In the latter event, a different indicator will be used in making the record member 55 but the same general principles apply and discoloration can be measured as an indication of the concentration of a substance, or, in fact, as an indication of variations in various phenomena. For example, the phenomenon to be measured can be made to change the acidity or alkalinity, e. g. the pH or hydrogen ion concentration, of a medium such as the body of water 44 and the departure from neutrality can be measured, i. e., indicated or recorded, by using the principles of the present invention. Thus, ammonia or amines, either free or resulting from thermal decomposition, can be made to modify a medium which is then applied to a suitable record member to obtain the desired measurement. In addition, indicators other than the pH-responsive type can be used. For example, measurements can be made using (1) starch-iodide paper reacting with halogens or other oxidizing agent; (2) lead acetate paper reacting with hydrogen sulfide; (3) etc.

The words "discolor" or "discoloration" are used in a generic sense in this specification and have reference to the production of a visible record or mark, whether contrasting from its surroundings in color or tone.

Various changes and modifications can be made without departing from the spirit of the invention as defined in the appended claims.

We claim as our invention:

1. In a device for recording at a recording station a variable phenomenon by use of a record member, having a component chemically reactive with a chemical-containing fluid medium to produce a change in appearance of said record member in the zone of such reaction, the amount of chemical in said fluid medium varying from time to time with the phenomenon, to be recorded, the combination of: means for moving said record member relative to said recording station; a fluid-expelling member providing a space for receiving said fluid medium; actuating means for moving said fluid-expelling member toward and away from said record member to transfer said fluid medium from said fluid-expelling member to said record member; and means for operatively connecting said means for moving said record member and said actuating means to apply increments of said fluid medium to said record member at positions spaced from each other along said record member.

2. In a device for recording at a recording station a variable phenomenon by use of a record member providing side-by-side transverse bands, each band containing an indicator chemically reactive with a chemical-containing fluid medium to produce a change in appearance of the record member in the zone of such reaction, said bands of said record member being fluid-isolated from each other to prevent fluid applied to one band from reaching an adjacent band, the amount of chemical in said fluid medium varying from time to time with the phenomenon to be recorded, the combination of: means for moving said record member relative to said recording station to present said bands successively to said recording station; a fluid-expelling member providing a space for receiving said fluid medium; actuating means for moving said fluid-expelling member into and out of fluid-transferring relationship with said record member to successively transfer an increment of said fluid medium from said fluid-expelling member to said record member; and means for operatively connecting said means for moving said record member and said actuating means to apply said increments of said fluid medium to successive bands of said record member.

3. A device as defined in claim 2, in which said means for moving said record member relative to said recording station includes a drive means and means for intermittently connecting said drive means to said record member to advance said record member step by step to present said bands successively to said recording station, and in which said actuating means includes means operatively connected to said drive means for moving said fluid-expelling member toward and away from said record member, and in which said operatively connecting means includes means for timing the movement of said fluid-expelling member and the step-by-step advancement of said record member to bring the former into fluid-transferring relationship with the latter between periods of advancement of the latter.

4. In a device for recording at a recording station a variable phenomenon by use of a record member providing side-by-side transverse bands, each band containing an indicator chemically reactive with a chemical-containing fluid medium to produce a change in appearance of the record member in the zone of such reaction, said bands of said record member being fluid-isolated from each other to prevent fluid applied to one band from reaching an adjacent band, the amount of chemical in said fluid medium varying from time to time with the phenomenon to be recorded, the combination of: means for moving said record member relative to said recording station to present said bands successively to said recording station; a fluid-expelling member providing a space for receiving said fluid medium and providing a small passage communicating with said space and providing an end portion; means for mounting said fluid-expelling member to dispose said end portion of the passage near the center of each transverse band as it arrives at said recording station to deliver said fluid medium to the central portion of each band whereby said fluid medium may spread in opposite directions from said central portion along said band; and means for expelling fluid medium from said space through said passage to said record member in timed relationship with the arrival of the successive transverse bands at said recording station.

ARNOLD O. BECKMAN.
JAMES D. McCULLOUGH.

REFERENCES CITED

The following references are of record in the file of this patent:

UNITED STATES PATENTS

| Number | Name | Date |
|---|---|---|
| 387,936 | West | Aug. 14, 1888 |
| 462,504 | Olan | Nov. 3, 1891 |
| 562,834 | Knauss et al. | June 30, 1896 |
| 691,249 | Dieterich | Jan. 14, 1902 |
| 728,022 | Schultze | May 12, 1903 |
| 749,305 | Lenot | Jan. 12, 1904 |
| 904,310 | Cole | Nov. 17, 1908 |
| 1,012,639 | Holmgren | Dec. 26, 1911 |
| 1,044,835 | Wattles | Nov. 17, 1912 |
| 1,063,091 | Wever | May 27, 1913 |
| 1,205,724 | Fairlie | Nov. 21, 1916 |
| 1,216,303 | Freeman | Feb. 20, 1917 |
| 1,560,660 | Cain | Nov. 10, 1925 |
| 1,719,864 | Zimmerman | July 9, 1929 |
| 1,755,793 | Peters | Apr. 22, 1930 |
| 1,919,861 | Rodhe | July 25, 1933 |
| 1,943,684 | Martin et al. | Jan. 16, 1934 |
| 1,960,465 | Thomas | May 29, 1934 |
| 1,967,895 | Marvin | July 24, 1934 |
| 2,088,683 | Babson | Aug. 3, 1937 |
| 2,105,226 | Pratt | Jan. 11, 1938 |
| 2,153,568 | Johnson | Apr. 11, 1939 |
| 2,174,349 | Littlefield | Sept. 26, 1939 |
| 2,181,533 | Kline et al. | Nov. 28, 1939 |
| 2,230,593 | Hassler | Feb. 4, 1941 |
| 2,232,622 | Moses et al. | Feb. 18, 1941 |
| 2,236,373 | Kowalski | Mar. 25, 1941 |
| 2,345,090 | Brace | Mar. 28, 1944 |
| 2,422,852 | Ratcliffe | June 24, 1947 |

FOREIGN PATENTS

| Number | Country | Date |
|---|---|---|
| 460,108 | Great Britain | Jan. 21, 1937 |
| 517,462 | Great Britain | Jan. 31, 1940 |

OTHER REFERENCES

Olsen et al., "Quant. Det. of Conc. of Vaporized $CCl_4$." Ind. and Eng. Chem., Anal. Ed., vol. 8, pages 260–263, July 15, 1936.

Hoogeveen, J. Soc. Chem. Ind., vol. 18, page 551, 1940.